(12) United States Patent
Arbel

(10) Patent No.: US 10,290,287 B1
(45) Date of Patent: May 14, 2019

(54) VISUALIZING OPERATION OF A MEMORY CONTROLLER

(71) Applicant: Xilinx, Inc., San Jose, CA (US)

(72) Inventor: Ygal Arbel, Morgan Hill, CA (US)

(73) Assignee: XILINX, INC., San Jose, CA (US)

( * ) Notice: Subject to any disclaimer, the term of this patent is extended or adjusted under 35 U.S.C. 154(b) by 905 days.

(21) Appl. No.: 14/321,360

(22) Filed: Jul. 1, 2014

(51) Int. Cl.
*G09G 5/37* (2006.01)
*G09G 5/377* (2006.01)
*G06T 15/04* (2011.01)
*G06T 11/00* (2006.01)

(52) U.S. Cl.
CPC ............... *G09G 5/37* (2013.01); *G09G 5/377* (2013.01); *G06T 11/001* (2013.01); *G06T 15/04* (2013.01)

(58) Field of Classification Search
CPC ..... G06T 11/001; G06T 15/04; G06T 15/005; G06F 9/4443; G06F 3/14
See application file for complete search history.

(56) References Cited

U.S. PATENT DOCUMENTS

| | | | | |
|---|---|---|---|---|
| 5,432,924 A * | 7/1995 | D'Souza | ............... | G06F 9/4428 707/999.202 |
| 5,717,902 A * | 2/1998 | D'Souza | ............... | G06F 9/4428 707/999.001 |
| 6,629,292 B1 * | 9/2003 | Corson | ................. | H01L 23/544 257/E23.179 |
| 7,978,196 B2 * | 7/2011 | Combes | ................... | G06T 11/20 345/441 |
| 8,077,537 B2 * | 12/2011 | Kawakubo | ........... | G11C 7/1027 365/222 |
| 8,780,114 B1 * | 7/2014 | Jackey | .................. | G06T 11/323 345/440 |
| 2002/0103975 A1 * | 8/2002 | Dawkins | ............... | G06F 12/122 711/133 |
| 2004/0117768 A1 * | 6/2004 | Chang | ................. | G06F 11/3664 717/125 |
| 2006/0092280 A1 * | 5/2006 | Kamijo | .............. | G06K 9/00785 348/169 |
| 2006/0279478 A1 * | 12/2006 | Ikegami | ............... | G09G 3/2025 345/30 |
| 2007/0288242 A1 * | 12/2007 | Spengler | .................. | G10L 15/20 704/275 |
| 2008/0300053 A1 * | 12/2008 | Muller | ..................... | G06F 17/24 463/31 |
| 2008/0309954 A1 * | 12/2008 | Tsai | .................... | H04N 1/40062 358/1.9 |
| 2009/0092337 A1 * | 4/2009 | Nagumo | ............... | G06T 3/4053 382/299 |
| 2009/0225335 A1 * | 9/2009 | Kubo | ................. | H04N 1/40068 358/1.9 |
| 2009/0249017 A1 * | 10/2009 | Prebble | .................. | G06F 12/08 711/170 |

(Continued)

*Primary Examiner* — Abderrahim Merouan
(74) *Attorney, Agent, or Firm* — Kevin T. Cuenot

(57) ABSTRACT

Visualizing operations of a memory controller includes reading, using a processor, a plurality of commands of a memory controller from a data store, wherein the commands are associated with times of issue. Blocks are displayed for the plurality of commands upon a display device as a raster image. The blocks are ordered according to the times of issue of the commands represented by the blocks. The blocks are visually distinguished according to command type within the raster image.

20 Claims, 6 Drawing Sheets

(56) References Cited

U.S. PATENT DOCUMENTS

| | | | | |
|---|---|---|---|---|
| 2010/0146201 | A1* | 6/2010 | Kawakubo | G11C 7/1027 711/106 |
| 2010/0299535 | A1* | 11/2010 | Du | G06K 15/02 713/189 |
| 2011/0099539 | A1* | 4/2011 | Shafi | G06F 11/3636 717/128 |
| 2011/0249011 | A1* | 10/2011 | Lalonde | G06T 1/20 345/522 |
| 2014/0118368 | A1* | 5/2014 | Fraser | G06T 11/60 345/522 |
| 2015/0019792 | A1* | 1/2015 | Swanson | G06F 9/466 711/102 |
| 2015/0112969 | A1* | 4/2015 | Prabhu | G06F 17/30268 707/722 |
| 2015/0227661 | A1* | 8/2015 | Sasaki | G06F 17/5022 703/15 |

* cited by examiner

VISUALIZING OPERATION OF A MEMORY CONTROLLER

FIELD OF THE INVENTION

This disclosure relates to integrated circuits (ICs) and, more particularly, to visualizing operation of a memory controller.

BACKGROUND

Many electronic systems utilize a memory controller and a corresponding memory. The memory controller controls operation of the memory by issuing commands to the memory. For a given type of memory, the memory controller must issue commands in a sequence that complies with timing requirements and command dependencies of the particular memory being used. Before issuing a command, the memory controller must satisfy these timing requirements and dependencies.

The memory controller has a significant amount of freedom as to the order of commands issued to the memory. The memory controller may issue commands in any of a variety of different sequences. While all sequences issued by the memory controller must conform to the command timing requirements and dependencies of the memory, some command sequences are more efficient than others.

When analyzing an electronic system, designers typically rely upon text logs of signals sent from the memory controller to the memory. In other cases, designers view waveforms of the individual signals from the memory controller to the memory presented on a linear timeline. Such interfaces, however, are not intuitive for purposes of evaluating performance or debugging the electronic system.

SUMMARY

A method includes reading, using a processor, a plurality of commands of a memory controller from a data store, wherein the commands are associated with a time of issue, and displaying blocks for the plurality of commands upon a display device as a raster image. The blocks are ordered according to the times of issue of the commands represented by the blocks. The method further includes, within the raster image, visually distinguishing the blocks according to command type.

A system includes a processor programmed to initiate executable operations. The executable operations include reading a plurality of commands of a memory controller from a data store, wherein the commands are associated with times of issue, and displaying blocks for the plurality of commands upon a display device as a raster image. The blocks are ordered according to the times of issue of the commands represented by the blocks. The executable operations also include, within the raster image, visually distinguishing the blocks according to command type.

A non-transitory computer-readable storage medium has instructions stored thereon which, when executed by a processor, perform a method. The method includes reading, using the processor, a plurality of commands of a memory controller from a data store, wherein the commands are associated with times of issue, and displaying blocks for the plurality of commands upon a display device as a raster image. The blocks are ordered according to the times of issue of the commands represented by the blocks. The method further includes, within the raster image, visually distinguishing the blocks according to command type.

Other features of the inventive arrangements will be apparent from the accompanying drawings and from the detailed description that follows.

BRIEF DESCRIPTION OF THE DRAWINGS

The inventive arrangements are illustrated by way of example and not limitation in the figures of the accompanying drawings. For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

DETAILED DESCRIPTION OF THE DRAWINGS

While the disclosure concludes with claims defining novel features, it is believed that the various features described within this disclosure will be better understood from a consideration of the description in conjunction with the drawings. The process(es), machine(s), manufacture(s) and any variations thereof described herein are provided for purposes of illustration. Specific structural and functional details described within this disclosure are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to integrated circuits (ICs) and, more particularly, to visualizing operation of a memory controller. In accordance with the inventive arrangements described within this disclosure, the sequencing of commands issued from a memory controller may be visualized. The commands are displayed as a raster image. In the raster image, time flows, and commands are arranged, from left to right and from top to bottom. The various types of commands issued by the memory controller are visually distinguished from one another. In addition, the duration of each command within the raster image is represented by the length of the command. That is, the length is proportional to the duration of the command.

The inventive arrangements described herein may be implemented as a method or process performed by a data processing system. In another aspect, the inventive arrangements may be implemented as a data processing system having a processor and a display device. The processor, upon executing program code, generates the visualizations, e.g., raster images, described herein. In still another aspect, the inventive arrangements may be implemented as a non-transitory computer-readable storage medium storing program code that, when executed, causes a processor and/or a system to perform a method or process.

Several definitions that apply throughout this document now will be presented. As defined herein, the term "automatically" means without user intervention. As defined herein, the term "user" means a human being. As defined herein, the term "raster image" is a visualization or picture stored in digital form that includes a predetermined pattern of scanning lines, or rows, that provide substantially uniform coverage of an area.

Figure 1:
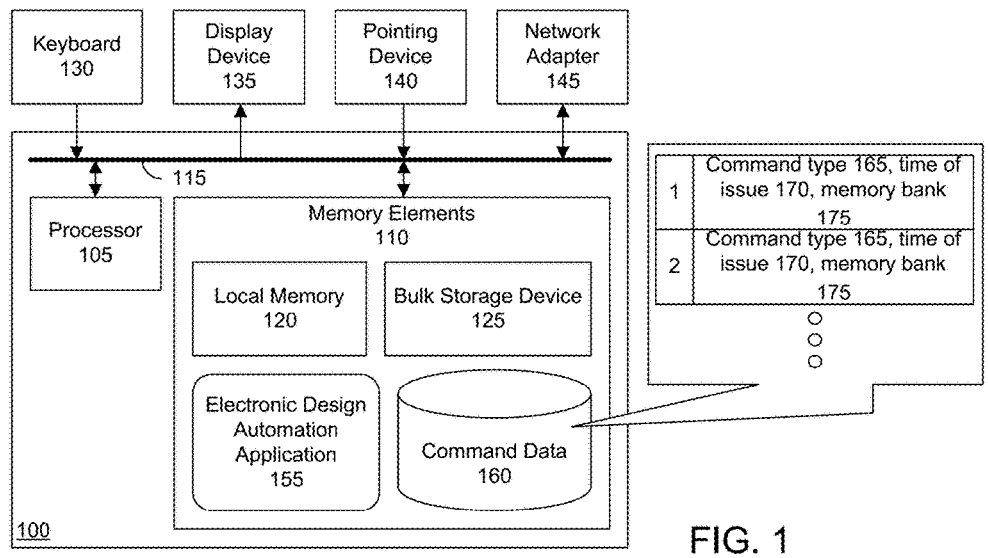
FIG. 1 is a block diagram illustrating an exemplary data processing system (system).

FIG. 1 is a block diagram illustrating an exemplary data processing system (system) 100. System 100 includes at least one processor, e.g., a central processing unit (CPU) 105 coupled to memory elements 110 through a system bus 115 or other suitable circuitry. System 100 stores program code within memory elements 110. Processor 105 executes the program code accessed from memory elements 110 via system bus 115. In one aspect, system 100 is implemented as a computer or other data processing system that is suitable for storing and/or executing program code. It should be appreciated, however, that system 100 can be implemented in the form of any system including a processor and memory that is capable of performing the functions described within this disclosure.

Memory elements 110 include one or more physical memory devices such as, for example, a local memory 120 and a bulk storage device 125. Local memory 120 refers to random access memory or other non-persistent memory device(s) generally used during actual execution of the program code. Bulk storage device 125 may be implemented as a hard disk drive (HDD), solid state drive (SSD), or other persistent data storage device. System 100 also may include one or more cache memories (not shown) that provide temporary storage of at least some program code in order to reduce the number of times program code must be retrieved from the bulk storage device during execution.

Input/output (I/O) devices such as a keyboard 130, a display device 135, and a pointing device 140 optionally can be coupled to system 100. The I/O devices can be coupled to system 100 either directly or through intervening I/O controllers. A network adapter 145 also can be coupled to system 100 to enable system 100 to become coupled to other systems, computer systems, remote printers, and/or remote storage devices through intervening private or public networks. Modems, cable modems, Ethernet cards, and wireless transceivers are examples of different types of network adapter 145 that can be used with system 100.

As pictured in FIG. 1, memory elements 110 can store an electronic design automation (EDA) application 155. EDA application 155, being implemented in the form of executable program code, is executed by system 100. As such, EDA application 155 is considered an integrated part of system 100. System 100, while executing EDA application 155, operates upon command data 160.

Command data 160 includes data generated by a memory controller. More particularly, command data 160 includes a plurality of commands. Each command within command data 160 is associated with a particular time of issuance so that the commands may be arranged in sequence according to time. Time of issuance may be specified in terms of clock cycles. In one aspect, command data 160 is obtained from operation of an electronic system where commands issued by a memory controller within the electronic system are stored for subsequent evaluation. In another aspect, command data 160 may be obtained from a simulation of an electronic system where commands issued by a memory controller of the electronic system are stored for subsequent evaluation. In still another aspect, command data 160 may be obtained from an emulation of an electronic system including a memory controller.

As pictured, command data 160 may include a plurality of different entries. For example, each command may be stored as an entry in which command type 165 is indicated, time of issue 170 is indicated, and memory bank 175 is indicated. Time of issue may be specified in terms of clock cycles.

EDA application 155 and any data items used, generated, and/or operated upon by EDA application 155 are functional data structures that impart functionality when employed as part of system 100. System 100, in executing EDA application 155, generates visualizations of command data 160 that are displayed on display device 135. In one aspect, the visualizations are raster images that include representations of the commands. A user of system 100 may choose to change the visualization of command data 160 generated by system 100 to view different levels of detail as desired and described herein with reference to the remaining figures.

Figure 2:
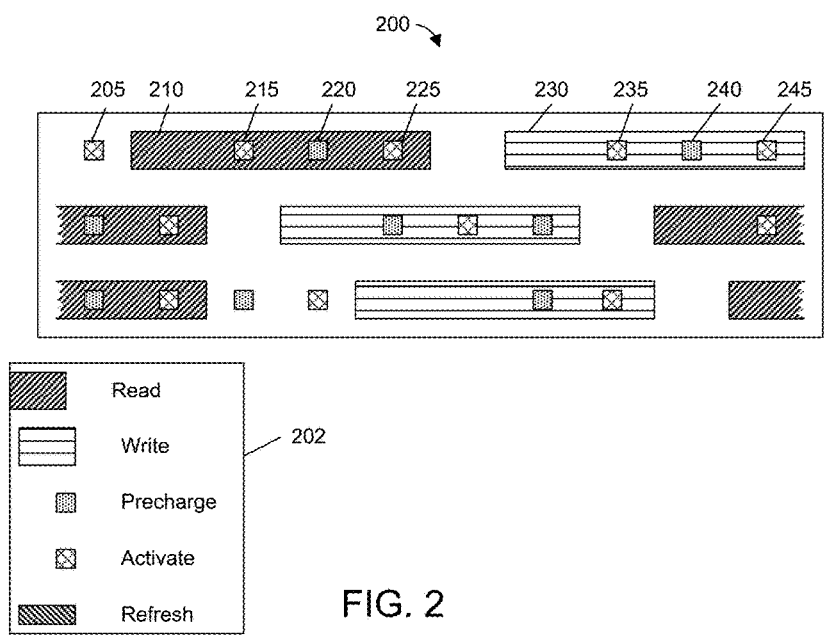
FIG. 2 is an exemplary visualization of memory controller operation.

FIG. 2 is an exemplary raster image 200 of memory controller operation. Raster image 200 is generated from command data for a memory controller. Raster image 200 may be generated by a system such as system 100 of FIG. 1 and displayed upon a display device. Raster image 200 includes a plurality of blocks. Each block represents a command issued from a memory controller. In one aspect, each block is rectangular in shape. It should be appreciated, however, that other shapes may be used such as blocks with rounded edges, or the like. Within this disclosure, the terms "block" and "command" may be used interchangeably from time to time, particularly when referring to a raster image.

For purposes of illustration, raster image 200 shows operation of a memory controller for a synchronous dynamic random access memory (SDRAM). It should be appreciated that the inventive arrangements described within this disclosure may be applied to memory controllers for any of a variety of different memory types controlled through the issuance of commands. Use of SDRAM is for purposes of illustration only.

Legend 202 illustrates the different command types that may be included in raster image 200. The different command types that may be represented within raster image 200 include a read command, a write command, a precharge command, an activate command, and a refresh command. As shown in legend 202, command types are visually distinguished from one another using shading or patterns. As such, all read commands have same shading or patterning. All write commands have same shading or patterning, etc. It should be appreciated that while command types are visually distinguished from one another using different patterns and/or shading, color also may be used as the differentiating feature for different command types.

Within raster image 200, each block is ordered according to time of issuance of the particular command represented by the block. Time increases from left to right in each row. Time also increases from top row to bottom row. In one aspect, precharge and activate commands are depicted using blocks that are smaller in length and/or height than read, write, and refresh commands. This allows overlap of different commands and command types to be more clearly illustrated in raster image 200.

The top row of commands (blocks) in raster image 200 includes an activate command 205. A read command 210 follows several clock cycles after activate command 205. Another activate command 215 starts immediately after the start of read command 210 and during read command 210. Activate command 215 is said to overlap read command 210. A precharge command 220 and another activate command 225 are also issued during write command 210. Precharge command 220 and activate command 225 overlap read command 210.

A write command 230 starts one clock cycle after read command 210. An activate command 235 begins after the start of write command 230, followed by a precharge command 240 and then an activate command 245. As pictured, activate command 235, precharge command 240, and activate command 245 occur during write command 230 and, as such, overlap write command 230.

The size of raster image 200 may be increased to reveal additional detail or reduced to reveal less detail. Within raster image 200, textual description is omitted. As the size of raster image 200 is increased, or as feature sizes are increased, additional text, gridlines showing timing information, bank information, and the like may be displayed by the system.

Each command illustrated has a known duration and a length in the x-direction representing the duration as measured in clock cycles. The start, e.g., first clock cycle, of each command is specified by the time of issue for the command.

Figure 3:
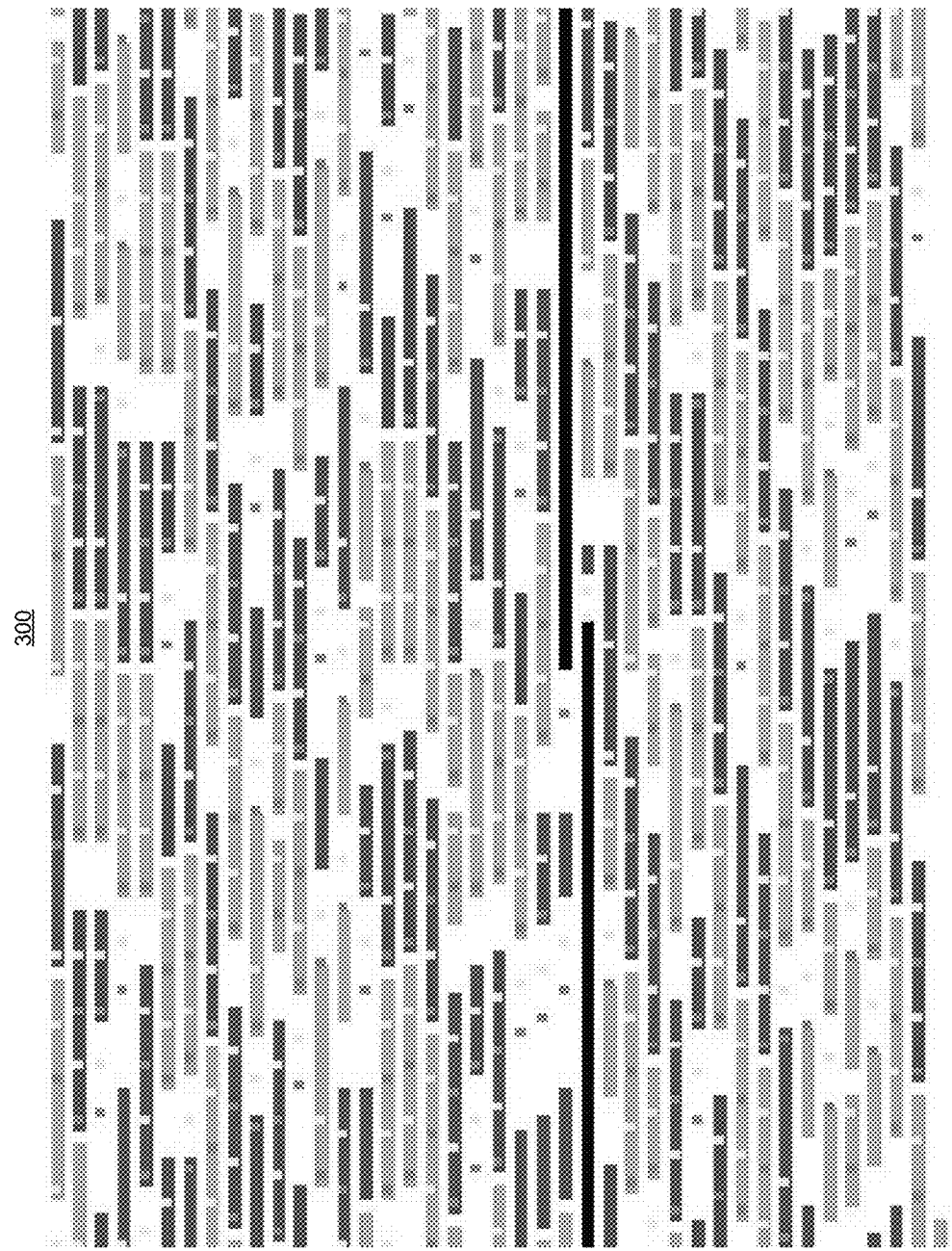
FIG. 3 is another exemplary visualization of memory controller operation.

FIG. 3 is another exemplary visualization of memory controller operation. Raster image 300 is generated from command data for a memory controller. Raster image 300 may be generated by a system such as system 100 of FIG. 1 and displayed upon a display device. Raster image 300 is 900×700 pixels and includes approximately 7,200 clock cycles of command data for a memory controller. Within raster image 300, the white space indicates the absence of a command. Larger areas of white indicate memory controller inactivity and potential inefficiency in sequencing commands.

Figure 4:
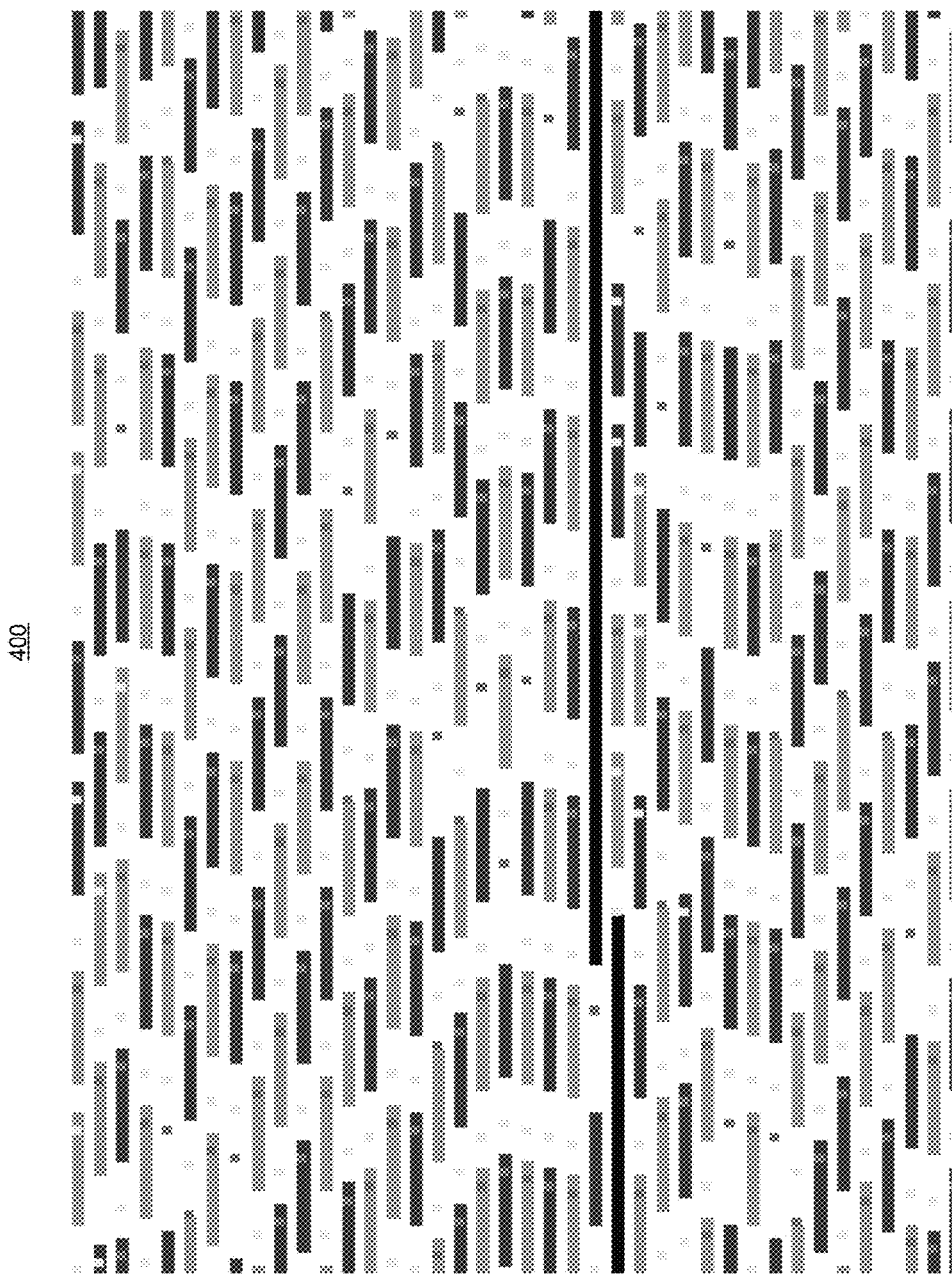
FIG. 4 is another exemplary visualization of memory controller operation.

FIG. 4 is another exemplary visualization of memory controller operation. Raster image 400 is generated from command data for a memory controller and displayed upon a display device. Raster image 400 may be generated by a system such as system 100 of FIG. 1. Raster image 400 exhibits more white space, e.g., space within raster image 400 unoccupied by a command, than raster image 300 of FIG. 3. The clock cycles are effectively wasted as no commands are issued during the time represented by white space within raster image 400. Thus, raster image 400 illustrates less efficient operation of a memory controller than is the case with raster image 300 of FIG. 3. More particularly, operation of the memory controller shown in FIG. 3 is less efficient at scheduling overlapping commands than the memory controller shown in FIG. 4. The lightest shaded, square-shaped blocks are activate commands. As readily seen in raster image 400, the activate commands are largely scheduled independently of other commands. The activate commands do not overlap other, longer duration commands such as read commands or write commands.

Figure 5:
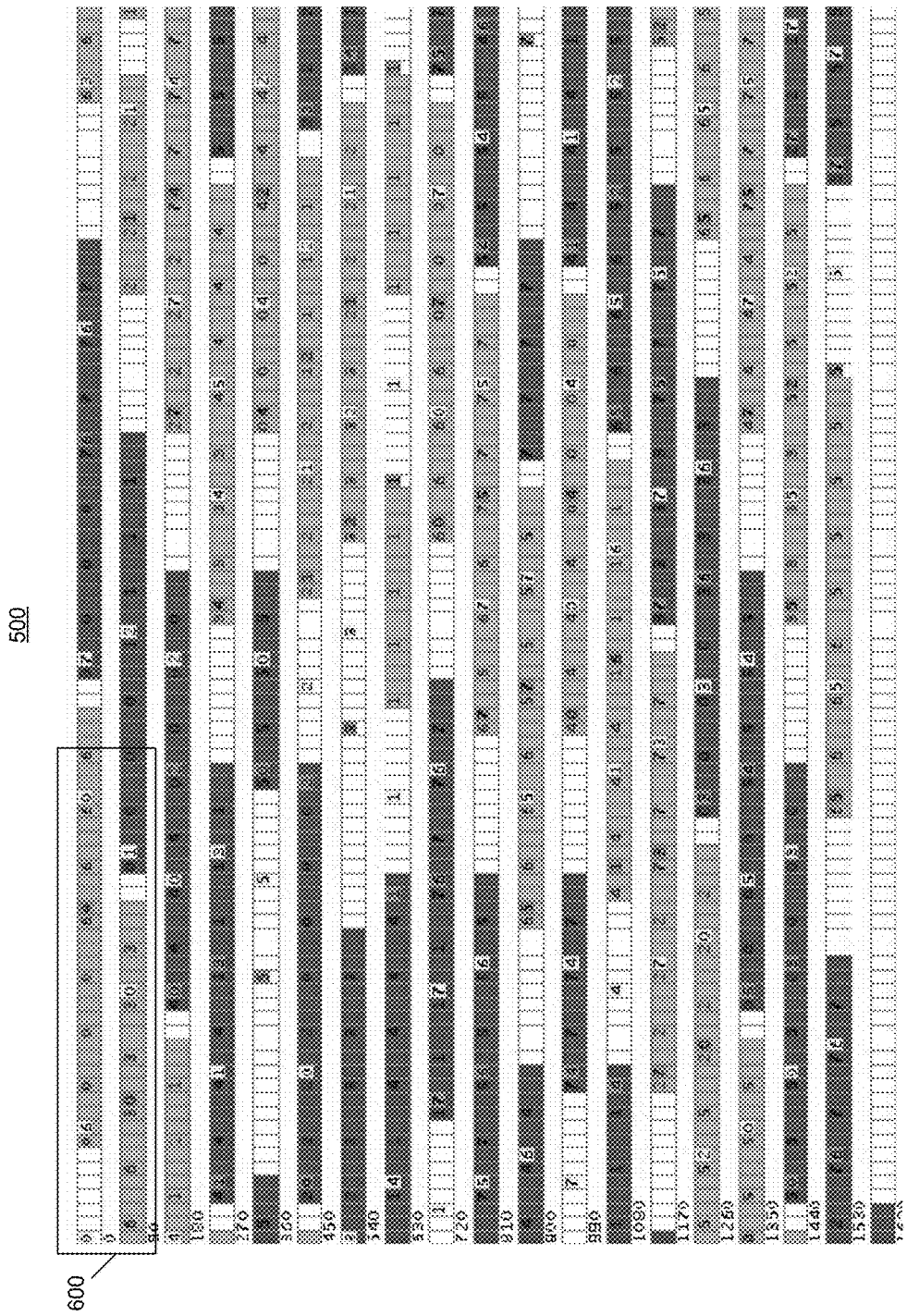
FIG. 5 is another exemplary visualization of memory controller operation.

FIG. 5 is another exemplary visualization of memory controller operation. Raster image 500 generated from command data for a memory controller and displayed upon a display device. Raster image 500 may be generated by a system such as system 100 of FIG. 1. The feature size of raster image 500 is larger than illustrated in either of FIG. 3 or 4. For example, a user may provide an input to the system requesting increased resolution or increased feature size. Responsive to the input, the system may regenerate or redraw a raster image with increased detail or increased feature sizes as illustrated in FIG. 5.

Increasing the feature size allows the system to display additional information not illustrated in either of FIG. 3 or 4. In one aspect, grid lines may be displayed. The grid lines indicate clock cycles within the rows of raster image 500. Further, text may be included in raster image 500 or superimposed thereon. In the example of FIG. 5, the text in a block indicates the particular bank where the command represented by the block is directed. The bank number is displayed in the first clock cycle of each block. As illustrated, precharge and activate commands are single-cycle commands. Precharge and activate commands may be overlapped with read commands and/or write commands. The overlap is illustrated by the lighter shaded blocks with numerals only partially covering darker blocks representing read commands and/or write commands. It should be appreciated that, to the extent that commands may be overlapped with read commands or write commands, such overlap may not occur on the $1^{st}$ clock cycle of the read command or the write command. Overlap may occur on the $2^{nd}$, $3^{rd}$, or $4^{th}$ clock cycle of a read command or a write command.

Figure 6:
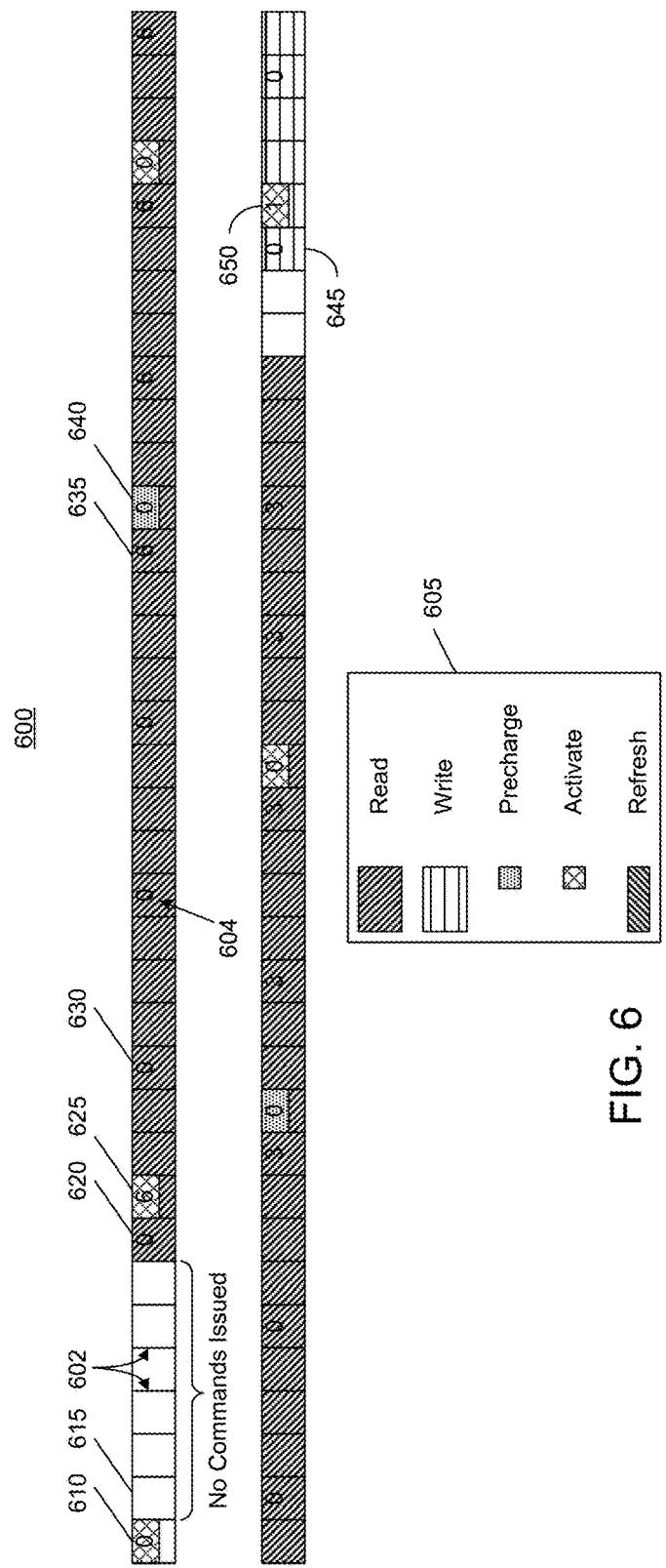
FIG. 6 is a portion of raster image of FIG. 5 shown in greater detail.

FIG. 6 is a portion 600 of raster image 500 of FIG. 5 shown in greater detail. Portion 600 illustrates the inclusion of gridlines 602 and text 604. Starting in the first row at the left, an activate command 610 is issued during a first clock cycle. Activate command 610 is issued to bank 0 as indicated by the text now displayed in over activate command 610. Following activate command 610 are 6 clock cycles in which no commands are issued, e.g., six instances of an empty time slot 615.

Following the inactivity, a read command 620 is issued on bank 0. The next clock cycle, overlapped with read command 620, an activate command 625 is issued. As previously discussed, a read command has a duration of four (4) clock cycles. Another read command 630 is issued on bank 0 following read command 620. Subsequently, a read command 635 is issued on bank 6. Immediately following read command 635, i.e., on the next clock cycle, a precharge command 640 is issued on bank 0 and overlaps with read command 635.

In the second row, read commands continue to issue with an overlapping precharge command on bank 0 and an overlapping activate command on bank 0. Following two clock cycles of inactivity, a write command 645 is issued on bank 0. On the next clock cycle, an activate command 650 is issued on bank 1. Activate command 650 overlaps write command 645.

Figure 7:
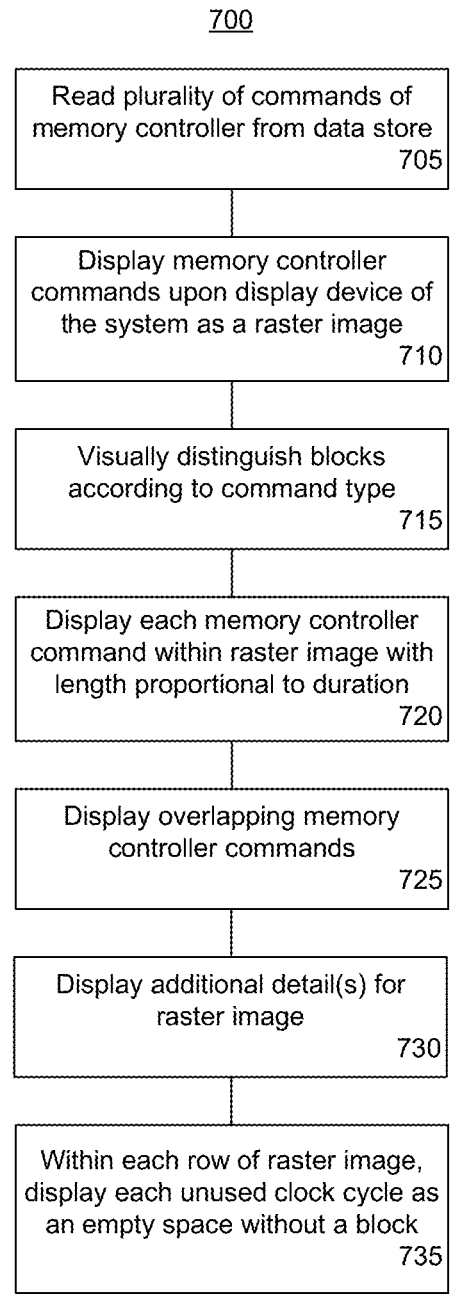
FIG. 7 is a flow chart illustrating a method of visualizing operation of a memory controller.

FIG. 7 is a flow chart illustrating a method 700 of visualizing operation of a memory controller. Method 700 may be performed by a system such as system 100 of FIG. 1 or another comparable system. In one aspect, the memory controller commands may be obtained or collected from a simulation of a memory controller or a simulation of a system including a memory controller. In another aspect, the memory controller commands issued from a memory controller in a live electronic system may be stored for later analysis. In still another aspect, memory controller commands may be obtained or collected from emulation of a system including a memory controller.

In block 705, the system reads a plurality of commands of a memory controller from a data store. The data store may be any of a variety of non-transitory computer-readable storage media storing the plurality of commands. Within the data store, each command is associated with a time of issue. In block 710, the system displays a block for each of the plurality of commands upon a display device of the system as a raster image. In one aspect, commands are drawn within the raster image with a predetermined and like shape. For example, each memory controller command may be represented as a block, e.g., a rectangle, and, in some cases, as a square. Each block is ordered, in terms of starting point, within the raster image according to time of issue of the command represented by the block. In block 715, within the raster image, the system visually distinguishes the blocks according to command type. Commands of a same type may be drawn with same patterning, same shading, same coloring, etc. Commands of different types are visually distinguished from one another, e.g., using different shading, patterning, coloring, etc.

In block 720, the system generates each block within the raster image with a length that is proportional to the duration of the command represented by the block. The duration of each command may be represented or measured in clock cycles. In block 725, the system illustrates overlapping commands by overlapping one or more blocks over one or more other blocks within the raster image. Blocks are overlapped according to time of issue of each respective block.

A first block may be overlapped by a second block. In illustration, the first block may have a longer duration and may be drawn as longer or larger rectangle than the second block. In one example, shorter duration commands are drawn as blocks with a shorter length and a shorter height than longer duration commands. The smaller size allows the second block to be viewed more clearly when overlaid or superimposed on top of a longer duration, or first, block.

In block 730, responsive to a request for additional detail, the system displays the raster image, or a portion thereof, with one or more additional details. For example, the system may re-draw the raster image or portion thereof, with larger feature sizes. The system may re-draw the raster image or portion thereof in a zoomed in view. The features that may be added to the raster image may include, but are not limited to, displaying gridlines for clock cycles with the blocks representing commands within the raster image. Each clock cycle, for example, may be bounded by an outline so that each clock cycle may be visually distinguished from each other clock cycle. In another example, a memory bank number may be displayed or superimposed on each block as text. For example, the memory bank number may be displayed on the first clock cycle of each block in the raster image.

In block 735, within each row of the raster image, the system displays each unused clock cycle as an empty space without a block. In this regard, the system visually distinguishes areas within the raster image where no command is issued from those areas where a command is issued.

The inventive arrangements described within this disclosure facilitate the visualization of operation of a memory controller in an intuitive and effective way. From a relatively cursory view of a raster image, a designer may determine efficiency of operation of a memory controller and other potential issues. Gaps within the raster image that are empty slots, e.g., unoccupied by a block representing a command, may indicate inefficiencies in sequencing commands by the memory controller or inefficient utilization of system memory.

For purposes of explanation, specific nomenclature is set forth to provide a thorough understanding of the various inventive concepts disclosed herein. The terminology used herein, however, is for the purpose of describing particular aspects of the inventive arrangements only and is not intended to be limiting.

The terms "a" and "an," as used herein, are defined as one or more than one. The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system.

The term "and/or" as used herein refers to and encompasses any and all possible combinations of one or more of the associated listed items. It will be further understood that the terms "includes" and/or "including," when used in this disclosure, specify the presence of stated features, integers, steps, operations, elements, and/or components, but do not preclude the presence or addition of one or more other features, integers, steps, operations, elements, components, and/or groups thereof. It will also be understood that, although the terms first, second, etc. may be used herein to describe various elements, these elements should not be limited by these terms, as these terms are only used to distinguish one element from another.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Within this disclosure, the same reference characters are used to refer to terminals, signal lines, wires, and their corresponding signals. In this regard, the terms "signal," "wire," "connection," "terminal," and "pin" may be used interchangeably, from time-to-time, within this disclosure. It also should be appreciated that the terms "signal," "wire," or the like can represent one or more signals, e.g., the conveyance of a single bit through a single wire or the conveyance of multiple parallel bits through multiple parallel wires. Further, each wire or signal may represent bi-directional communication between two, or more, components connected by a signal or wire as the case may be.

One or more aspects described within this disclosure can be realized in hardware or a combination of hardware and software. One or more aspects can be realized in a centralized fashion in one system or in a distributed fashion where different elements are spread across several interconnected systems. Any kind of data processing system or other apparatus adapted for carrying out at least a portion of the methods described herein is suited.

One or more aspects further can be embedded in a computer program product, which includes all the features enabling the implementation of the methods described herein. The computer program product includes a computer-readable data storage medium. As defined herein, the term "computer-readable storage medium" means a storage medium that contains or stores program code for use by or in connection with an instruction execution system, apparatus, or device. As defined herein, a "computer-readable storage medium" is non-transitory and, as such, is not a transitory propagating signal per se. Examples of a computer-readable storage medium may include, but are not limited to, optical media, magnetic media, magneto-optical media, computer memory such as random access memory, a bulk storage device, e.g., hard disk, or the like.

The flowchart and block diagrams in the Figures illustrate the architecture, functionality, and operation of possible implementations of systems, methods and computer program products according to various aspects of the inventive arrangements disclosed herein. In this regard, each block in the flowchart or block diagrams may represent a module, segment, or portion of code, which includes one or more executable instructions for implementing the specified logical function(s). In one aspect, the blocks may be performed in accordance with the numeral in the various blocks shown. In other aspects, the blocks may be performed in different or varying order than the numerical values in the blocks suggest. For example, two blocks shown in succession may be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terms "computer program," "software," "application," "computer-usable program code," "program code," "executable code," variants and/or combinations thereof, in the present context, mean any expression, in any language, code or notation, of a set of instructions intended to cause a data processing system to perform a particular function either directly or after either or both of the following: a) conversion to another language, code, or notation; b) reproduction in a different material form. For example, program code can include, but is not limited to, a subroutine, a function, a procedure, an object method, an object implementation, an executable application, an applet, a servlet, a source code, an object code, a shared library/dynamic load library and/or other sequence of instructions designed for execution on a computer system.

Thus, throughout this disclosure, statements utilizing terms such as "processing" or "computing" or "calculating" or "determining" or "displaying" or the like, refer to the action and processes of a data processing system, e.g., a computer system, or similar electronic computing device, that manipulates and transforms data represented as physical (electronic) quantities within the computer system's registers and/or memories into other data similarly represented as physical quantities within the computer system memories and/or registers or other such information storage, transmission or display devices.

The corresponding structures, materials, acts, and equivalents of all means or step plus function elements in the claims below are intended to include any structure, material, or act for performing the function in combination with other claimed elements as specifically claimed.

A method includes reading, using a processor, a plurality of commands of a memory controller from a data store, wherein the commands are associated with times of issue, and displaying blocks for the plurality of commands upon a display device as a raster image. The blocks are ordered according to the times of issue of the commands represented by the blocks. The method further includes visually distinguishing the blocks according to command type within the raster image.

The method may include generating the blocks within the raster image with lengths proportional to a duration of the commands represented by the blocks.

The method may include overlapping a first block with a second block according to a time of issue of the first block and a time of issue of the second block.

In one aspect, the raster image includes one or more rows. The method may include displaying gridlines corresponding to clock cycles in the one or more rows of the raster image.

The method further may include displaying a number in a selected block. The number indicates a memory bank for the command represented by the selected block.

The raster image may include two or more rows of blocks and may be displayed with time increasing from left to right and from top to bottom.

In another aspect, the raster image includes one or more rows. Accordingly, the method may also include displaying unused clock cycles as empty space without a block within the one or more rows.

A system includes a processor programmed to initiate executable operations. The executable operations include reading a plurality of commands of a memory controller from a data store, wherein the commands are associated with times of issue, and displaying blocks for the plurality of commands upon a display device as a raster image. The blocks are ordered according to the times of issue of the commands represented by the blocks. The executable operations also include visually distinguishing the blocks according to command type within the raster image.

The executable operations may include generating the blocks within the raster image with lengths proportional to a duration of the commands represented by the blocks.

The executable operations may include overlapping a first block with a second block according to a time of issue of the first block and a time of issue of the second block.

In one aspect, the raster image includes one or more rows. Accordingly, the executable operations may include displaying gridlines corresponding to clock cycles in the one or more rows of the raster image.

The executable operations also may include displaying a number in a selected block. The number indicates a memory bank for the command represented by the selected block.

The raster image may include two or more rows of blocks and may be displayed with time increasing from left to right and from top to bottom.

In another aspect, the raster image includes one or more rows. Accordingly, the executable operations may include, within the one or more rows of the raster image, displaying unused clock cycles as empty space without a block.

A non-transitory computer-readable storage medium has instructions stored thereon which, when executed by a processor, perform a method. The method includes reading, using the processor, a plurality of commands of a memory controller from a data store, wherein the commands are associated with times of issue, and displaying blocks for the plurality of commands upon a display device as a raster image. The blocks are ordered according to the times of issue of the commands represented by the blocks. The method also includes visually distinguishing the blocks according to command type within the raster image.

The method may include generating the blocks within the raster image with lengths proportional to a duration of the commands represented by the blocks.

The method may include overlapping a first block over a second block according to a time of issue of the first block and a time of issue of the second block.

In one aspect, the raster image includes one or more rows. Accordingly, the method may include displaying gridlines corresponding to clock cycles in the one or more rows of the raster image.

The method may also include displaying a number in a selected block. The number indicates a memory bank for the command represented by the selected block.

In another aspect, the raster image may include two or more rows of blocks and may be displayed with time increasing from left to right and from top to bottom.

The features described within this disclosure can be embodied in other forms without departing from the spirit or essential attributes thereof. Accordingly, reference should be made to the following claims, rather than to the foregoing disclosure, as indicating the scope of such features and implementations.

What is claimed is:

1. A method, comprising:
reading, using a processor, a plurality of commands of a memory controller from a data store;
wherein the commands are issued from the memory controller to a memory for controlling operation of the memory and each command is associated with a time of issue to the memory and a duration;
displaying blocks representing the plurality of commands upon a display device as a raster image;
wherein the blocks are ordered according to the times of issue of the commands represented by the blocks;
visually distinguishing the blocks according to command type within the raster image; and
generating the blocks within the raster image with lengths proportional to the durations of the commands represented by the blocks.

2. The method of claim 1, further comprising:
obtaining the commands from at least one of a simulation of a system comprising the memory controller, an emulation of a system comprising the memory controller, or from operation of a system comprising the memory controller, wherein the commands are stored in the data store.

3. The method of claim 1, further comprising:
overlapping a first block with a second block according to the time of issue and the duration of the first block and the time of issue and the duration of the second block.

4. The method of claim 1, wherein the raster image comprises at least one row, the method further comprising:
displaying gridlines corresponding to clock cycles in the at least one row of the raster image.

5. The method of claim 1, further comprising:
responsive to a user input, modifying the raster image by displaying a number in a selected block of the raster image;
wherein the number indicates a memory bank for the command represented by the selected block.

6. The method of claim 1, wherein the raster image comprises at least two rows of blocks and is displayed with time increasing from left to right and from top to bottom.

7. The method of claim 1, wherein the raster image comprises at least one row, the method further comprising:
within the at least one row of the raster image, displaying unused clock cycles as empty space without a block.

8. A system, comprising:
a processor programmed to initiate executable operations comprising:
reading a plurality of commands of a memory controller from a data store;
wherein the commands are issued from the memory controller to a memory for controlling operation of the memory and each command is associated with a time of issue to the memory and a duration;
displaying blocks representing the plurality of commands upon a display device as a raster image;
wherein the blocks are ordered according to the times of issue of the commands represented by the blocks;
visually distinguishing the blocks according to command type within the raster image; and
generating the blocks within the raster image with lengths proportional to the durations of the commands represented by the blocks.

9. The system of claim 8, wherein the processor is further programmed to initiate executable operations comprising:
obtaining the commands from at least one of a simulation of a system comprising the memory controller, an emulation of a system comprising the memory controller, or from operation of a system comprising the memory controller, wherein the commands are stored in the data store.

10. The system of claim 8, wherein the processor is further programmed to initiate executable operations comprising:
overlapping a first block with a second block according to the time of issue and the duration of the first block and the time of issue and the duration of the second block.

11. The system of claim 8, wherein the raster image comprises at least one row, and wherein the processor is further programmed to initiate executable operations comprising:
displaying gridlines corresponding to clock cycles in the at least one row of the raster image.

12. The system of claim 8, wherein the processor is further programmed to initiate executable operations comprising:
responsive to a user input, modifying the raster image by displaying a number in a selected block of the raster image;
wherein the number indicates a memory bank for the command represented by the selected block.

13. The system of claim 8, wherein the raster image comprises at least two rows of blocks and is displayed with time increasing from left to right and from top to bottom.

14. The system of claim 8, wherein the raster image comprises at least one row, and wherein the processor is further programmed to initiate executable operations comprising:
within the at least one row of the raster image, displaying unused clock cycles as empty space without a block.

15. A non-transitory computer-readable storage medium having instructions stored thereon which, when executed by a processor, perform a method comprising:
reading, using the processor, a plurality of commands of a memory controller from a data store;
wherein the commands are issued from the memory controller to a memory for controlling operation of the memory and each command is associated with a time of issue to the memory and a duration;
displaying blocks representing the plurality of commands upon a display device as a raster image;
wherein the blocks are ordered according to the times of issue of the commands represented by the blocks;
visually distinguishing the blocks according to command type within the raster image; and
generating the blocks within the raster image with lengths proportional to the durations of the commands represented by the blocks.

16. The non-transitory computer-readable storage medium of claim 15, wherein the method further comprises:
obtaining the commands from at least one of a simulation of a system comprising the memory controller, an emulation of a system comprising the memory controller, or from operation of a system comprising the memory controller, wherein the commands are stored in the data store.

17. The non-transitory computer-readable storage medium of claim 15, wherein the method further comprises:
overlapping a first block with a second block according to the time of issue and the duration of the first block and the time of issue and the duration of the second block.

18. The non-transitory computer-readable storage medium of claim 15, wherein the raster image comprises at least one row, wherein the method further comprises:
displaying gridlines corresponding to clock cycles in the at least one row of the raster image.

19. The non-transitory computer-readable storage medium of claim 15, wherein the method further comprises:
responsive to a user input, modifying the raster image by displaying a number in a selected block of the raster image;
wherein the number indicates a memory bank for the command represented by the selected block.

20. The non-transitory computer-readable storage medium of claim 15, wherein the raster image comprises at least two rows of blocks and is displayed with time increasing from left to right and from top to bottom.

* * * * *